US010313550B2

(12) United States Patent
Nishiyama

(10) Patent No.: US 10,313,550 B2
(45) Date of Patent: Jun. 4, 2019

(54) IMAGE FORMING APPARATUS, CONTROL METHOD FOR IMAGE FORMING APPARATUS, AND NON-TRANSITORY COMPUTER-READABLE STORAGE MEDIUM

(71) Applicant: CANON KABUSHIKI KAISHA, Tokyo (JP)

(72) Inventor: Kaori Nishiyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/627,138

(22) Filed: Jun. 19, 2017

(65) Prior Publication Data

US 2017/0374228 A1 Dec. 28, 2017

(30) Foreign Application Priority Data

Jun. 28, 2016 (JP) ................................. 2016-127913

(51) Int. Cl.
*H04N 1/00* (2006.01)
*G06F 3/12* (2006.01)
(Continued)

(52) U.S. Cl.
CPC ......... *H04N 1/2323* (2013.01); *H04N 1/0097* (2013.01); *H04N 1/00708* (2013.01); *H04N 1/00724* (2013.01); *H04N 1/00771* (2013.01); *H04N 1/00779* (2013.01); *H04N 2201/0094* (2013.01)

(58) Field of Classification Search
None
See application file for complete search history.

(56) References Cited

U.S. PATENT DOCUMENTS 7,728,992 B2 * 6/2010 Yamamoto ............. B41J 11/009
347/14
8,777,207 B2 7/2014 Nishiyama
(Continued)

FOREIGN PATENT DOCUMENTS

| JP | 2004-191895 | 7/2004 |
| JP | 2012-226664 | 11/2012 |
| JP | 2014-35510 | 2/2014 |

*Primary Examiner* — Beniyam Menberu
(74) *Attorney, Agent, or Firm* — Venable LLP

(57) ABSTRACT

An image forming apparatus include an apparatus body, a cassette, and a size detector to detect a size of a sheet stored in the cassette. An image forming unit forms an image on a sheet fed from the cassette depending on a size setting and a type setting stored in a memory. In addition, a controller executes a first rewrite process to rewrite the size setting in a memory with size information acquired as a detection result of the size detector, if the cassette in an open state is closed, a determination process to determine whether the size information used for rewriting the size setting in the first rewrite process and the type setting stored in the memory satisfy a predetermined combination condition, and a second rewrite process to rewrite the type setting in the memory with predetermined type information that satisfies the combination condition with respect to the size information used for rewriting the size setting in the first rewrite process if the combination condition is not satisfied in the determination process.

17 Claims, 12 Drawing Sheets

(51) Int. Cl.
*G06K 15/02* (2006.01)
*H04N 1/23* (2006.01)

(56) References Cited

U.S. PATENT DOCUMENTS

| | | | |
|---|---|---|---|
| 9,086,668 B2 | 7/2015 | Nakamura | |
| 9,227,805 B2 | 1/2016 | Nishiyama | |
| 9,436,898 B2 | 9/2016 | Watanabe | |
| 2001/0007619 A1* | 7/2001 | Kakutani | B65H 3/44 400/582 |
| 2005/0270574 A1* | 12/2005 | Saito | H04N 1/00708 358/1.15 |
| 2006/0221165 A1* | 10/2006 | Kato | B41J 11/003 347/104 |
| 2006/0262337 A1* | 11/2006 | Kamata | G06F 3/1211 358/1.13 |
| 2007/0025745 A1* | 2/2007 | Aoki | G03G 15/5029 399/16 |
| 2008/0075479 A1* | 3/2008 | Genda | G03G 15/5016 399/23 |
| 2011/0277418 A1* | 11/2011 | Kunieda | B43M 3/045 53/117 |
| 2012/0163851 A1* | 6/2012 | Masuyama | G03G 15/5029 399/81 |
| 2012/0268753 A1* | 10/2012 | Tokuda | G06F 3/1204 358/1.2 |
| 2013/0135638 A1* | 5/2013 | Inui | G06K 15/02 358/1.9 |
| 2014/0078205 A1* | 3/2014 | Hayashi | B41J 11/003 347/16 |
| 2014/0203490 A1* | 7/2014 | Totsuka | B42B 5/00 270/1.01 |
| 2014/0268234 A1* | 9/2014 | Iida | G06K 15/4065 358/1.15 |
| 2015/0062635 A1 | 3/2015 | Anno | |
| 2016/0080600 A1* | 3/2016 | Nishida | H04N 1/00925 358/1.14 |

* cited by examiner

000# IMAGE FORMING APPARATUS, CONTROL METHOD FOR IMAGE FORMING APPARATUS, AND NON-TRANSITORY COMPUTER-READABLE STORAGE MEDIUM

BACKGROUND OF THE INVENTION

Field of the Invention

The present invention relates to an image forming apparatus forming an image on a sheet, a control method for the image forming apparatus, and a non-transitory computer-readable storage medium storing a program for executing the control method.

Description of the Related Art

In image forming apparatuses such as copying machines and printers, information, i.e., sheet information, related to size and type of sheets used as recording media is set through an operation panel provided integrally with the apparatus or through a driver software installed in an external computer. Such sheet information is usually set for each portion that supports the sheets, such as sheet feed cassettes and manual feed trays.

Meanwhile, some image forming apparatuses or control programs for controlling the image forming apparatuses are configured such that a prohibition process to determine whether a combination of the sheet information being set is appropriate. Japanese Unexamined Patent Application Publication No. 2012-226664 discloses a printer driver configured to determine whether a combination of sheet size and sheet type set by a user is supported by the printing apparatus, and if they are in a prohibited relationship, the printer driver instructs printing to be performed after automatically changing the sheet size.

Some image forming apparatuses are equipped with a detecting configuration by which a control unit within the apparatus detects the size of the sheet set in a sheet feed cassette. However, in an image forming apparatus configured to execute the prohibition process, if an automatic detection process of detecting the sheet size is executed by using such configuration, a combination of sheet size and sheet type that would normally be prohibited by the prohibition process may be set. That is, if automatic size detection is executed in a state where the sheet information having passed the prohibition process is stored in a storage portion such as a RAM, the sheet information may be overwritten by the detection result. In that case, an image forming process may be executed depending on a setting of a sheet size and sheet type that should essentially be prohibited, or the user was required to reset the sheet type voluntarily after understanding the prohibited relationship, and there was room for improvement of usability.

SUMMARY OF THE INVENTION

The present invention provides an image forming apparatus capable of improving usability in a configuration where information related to sheet size is detected automatically, and a control method thereof.

According to one aspect of the present invention, an image forming apparatus includes a sheet support portion configured to support a sheet, a size detection unit configured to detect a size of a sheet supported on the sheet support portion, a storage portion capable of storing a first information related to a size of a sheet supported on the sheet support portion and a second information related to a type of a sheet supported on the sheet support portion, and a control unit configured to execute a determination process if the control unit acquires a detection result of a size of a sheet supported on the sheet support portion by the size detection unit in a state where the first information and the second information that satisfy a predetermined combination condition are stored in the storage portion, the control unit being configured to determine in the determination process whether the detection result of the size of the sheet satisfies the combination condition with respect to the second information stored in the storage portion. The control unit is implemented by one or more processors.

According to another aspect of the present invention, an image forming apparatus includes a sheet support portion configured to support a sheet, a size detection unit configured to detect a size of a sheet supported on the sheet support portion, a user interface configured to input a size and a type of a sheet supported on the sheet support portion and to display an image, and a control unit configured to control the user interface such that if the control unit acquires a detection result of a size of a sheet supported on the sheet support portion by the size detection unit in a state where a size and a type of a sheet supported on the sheet support portion has been inputted through the user interface, and if a combination of the type of the sheet having been inputted through the user interface and the detection result of the size of the sheet detect by the size detection unit corresponds to a predetermined prohibited combination, the user interface displays a set screen on which a type of a sheet supported on the sheet support portion is inputted. The control unit is implemented by one or more processors.

According to another aspect of the present invention, an image forming apparatus includes a sheet support portion configured to support a sheet, a size detection unit configured to detect a size of a sheet supported on the sheet support portion, a user interface configured to input a size and a type of a sheet supported on the sheet support portion and to display an image, and a control unit configured to control the user interface such that if the control unit acquires a detection result of a size of a sheet supported on the sheet support portion by the size detection unit in a state where a size and a type of a sheet supported on the sheet support portion has been inputted through the user interface, and if a combination of the type of the sheet having been inputted through the user interface and the detection result of the size of the sheet detected by the size detection unit corresponds to a predetermined prohibited combination, the user interface displays a notification image making a notification that a setting of a type of a sheet has been changed in accordance with a predetermined rule. The control unit is implemented by one or more processors.

According to another aspect of the present invention, a control method for an image forming apparatus includes storing a first information related to a size of a sheet supported on a sheet support portion into a storage portion, storing a second information related to a type of a sheet supported on the sheet support portion into the storage portion, and determining whether a detection result of a size of a sheet supported on the sheet support portion satisfies a predetermined combination condition with respect to the second information stored in the storage portion, the determining step being executed if the size of the sheet supported on the sheet support portion is detected by the size detection unit in a state where the first information and the second information that satisfy a predetermined combination condition is stored in the storage portion.

Further features of the present invention will become apparent from the following description of exemplary embodiments with reference to the attached drawings.

DESCRIPTION OF THE EMBODIMENTS

Now, an image forming apparatus according to the present disclosure will be described with reference to the drawings.

First Embodiment

Figure 1:
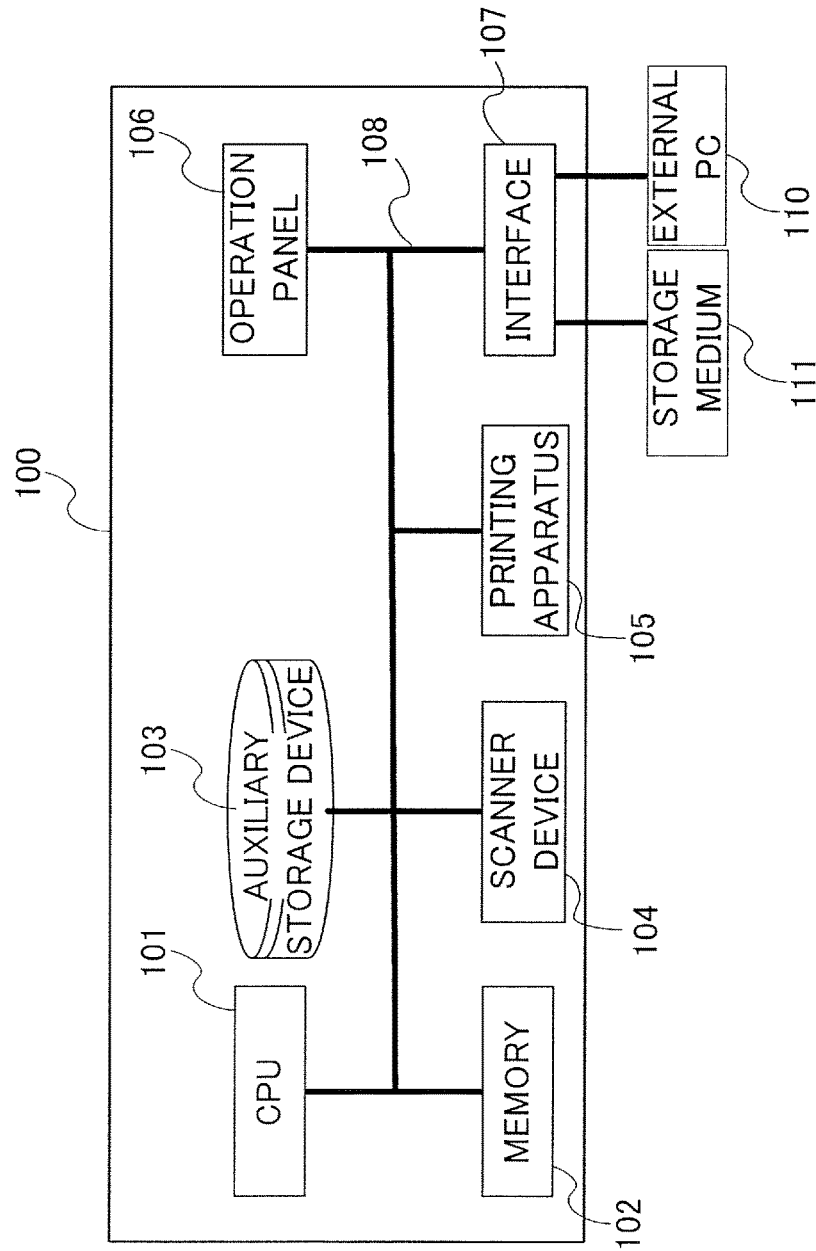
FIG. 1 is a block diagram illustrating a basic configuration of an image forming apparatus.

As illustrated in FIG. 1, an image forming apparatus 100 is a multifunction printer equipped with a printing apparatus 105 configured to form an image on a recording medium, i.e., sheet, such as paper. The image forming apparatus 100 includes a CPU 101, a memory 102, an auxiliary storage device 103, a scanner device 104, printing apparatus 105, an operation panel 106, and an interface 107. These respective elements are mutually connected via an internal bus 108. Further, the CPU 101 is capable of mutually communicating with an external computer (external PC) 110 via the interface 107, and the CPU 101 is also capable of reading data stored in a non-transitory computer-readable storage medium 111, such as a DVD or a USB memory.

The CPU 101 serving as a control unit is configured to read a program stored in the memory 102 or the auxiliary storage device 103, based on which the printing apparatus 105 executes a printing operation, i.e., an image forming operation, and the CPU 101 performs integrated control of the image forming apparatus 100. The memory 102 serving as a storage portion capable of storing information related to sheets includes a rewritable random access memory (RAM) and a read only memory (ROM), and it is used as a storage location of programs and setting information regarding printing operations. The auxiliary storage device 103 is composed of a large-capacity storage device such as a hard disk, and stores large-capacity data and execution codes of programs. Further, the auxiliary storage device 103 stores data that should be stored for a longer period of time compared to the memory 102.

Figure 2A:
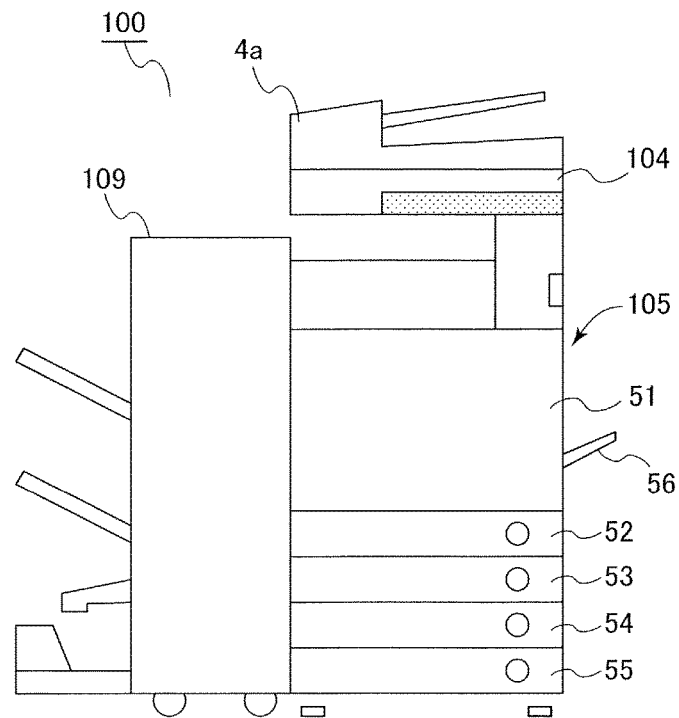
FIG. 2A is a front view illustrating an external appearance of the image forming apparatus.

As illustrated in FIG. 2A, the image forming apparatus 100 includes the scanner device 104 serving as an image input device, the printing apparatus 105 serving as an image output device, and a finisher 109 serving as a sheet processing apparatus. The printing apparatus 105 constitutes an apparatus body of the image forming apparatus 100. Further, the finisher 109 serving as an optional apparatus that can be attached to and detached from the apparatus body is capable of executing processes such as aligning, stapling or folding (including bookbinding) of sheets outputted from an image forming unit 51.

The scanner device 104 includes a document feeder 4a capable of feeding documents one at a time, and the document fed from the document feeder 4a or placed on a platen is optically scanned and converted into electronic image data by a photoelectric conversion element such as a CCD image sensor. The CPU 101 determines whether the document is color or monochrome, and determines a document size based on image data acquired by the scanner device 104.

The printing apparatus 105 includes the image forming unit 51 configured to form an image on a sheet, and sheet feed cassettes 52, 53, 54 and 55 configured to store sheets. Sheet feed cassettes 52 through 55 serving as storage portions are capable of storing thin recording media including not only papers and envelopes but also plastic films for overhead projectors (OHP) and cloth. Further, a manual feed apparatus 56 in which a user can set a sheet manually is arranged on a side surface of the printing apparatus 105. The sheet feed cassettes 52 through 55 and the manual feed apparatus 56 are examples of a sheet support portion capable of supporting sheets to be fed to the image forming unit 51.

Figure 2B:
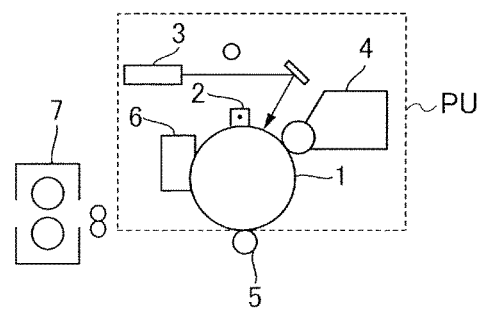
FIG. 2B is a schematic view illustrating a configuration of an image forming unit.

The image forming unit 51 serving as an example of an image forming portion includes an image forming unit PU adopting an electro-photographic system as illustrated in FIG. 2B, for example. The image forming unit PU includes a photosensitive drum formed of a photoconductor, a charging unit 2, an exposing unit 3, a developing unit 4, and a cleaner 6. In a state where a starting of image forming operation is instructed from the CPU 101, the charging unit 2 charges the surface of the photosensitive drum 1 uniformly, and the exposing unit 3 scans the photosensitive drum 1 based on the image data, by which an electrostatic latent image is formed. The developing unit 4 supplies charged toner to the photosensitive drum 1 and develops the electrostatic latent image into a toner image. The toner image borne on the photosensitive drum 1 is transferred directly, or indirectly via an intermediate transfer body, to a sheet by a transfer roller 5. The toner image transferred onto the sheet is fixed to the sheet by a fixing unit 7 adopting a thermal fixing system.

The image forming unit 51 executes these image forming operations to form an image on a sheet based on the image data acquired by the scanner device 104 or the image data entered from an external PC 110. The image forming unit 51 can be equipped with a plurality of image forming units PU corresponding to a plurality of toner colors. The image forming unit 51 can also be equipped with an inkjet-type or other known types of image forming units in place of the electro-photographic system.

The image forming apparatus 100 is equipped with the operation panel 106 serving as a user interface provided to the apparatus. The operation panel 106 serving as a display unit includes a touch panel 6a (refer to FIGS. 3 through 5) capable of displaying one or more among a plurality of images, and hard keys such as ten-key and a start button. The CPU 101 acquires information, i.e., printing information, based on the operation of the touch panel 5a and the hard keys by the user. The printing information includes information on the sheet serving as an output object, and a setting whether to perform duplex printing, and is utilized by the CPU 101 to output deliverables by appropriately operating the image forming apparatus 100.

If a request to start an image forming operation is entered to the image forming apparatus 100 through operation of the operation panel 106 or by an input signal from an external PC, the CPU 101 starts a printing job in which the printing apparatus 105 executes the image forming operation. In the printing job, the CPU 101 controls the sheet feeding operation by the sheet feed cassettes 52 through 55 and the manual feed apparatus 56, and the respective steps of the image forming operation by the image forming unit 51 based on the printing information.

Sheet Information

Next, a method for setting the information related to size and type of the sheet stored in the sheet feed cassettes 52 through 55 will be described. It is noted that the size of the sheet, i.e., sheet size, refers to a combination of a length of the sheet in a sheet feeding direction and a sheet width, i.e., a length of a sheet in a direction orthogonal to sheet feeding direction. Further, a type of sheet, i.e., sheet type, refers to an arbitrary classification that can be identified by characteristics other than the size, such as the material or thickness, i.e., basis weight, of the sheet, whether surface treatment has been performed, or whether a special shape such as an index tab exists. In the following description, unless denoted otherwise, a "sheet" refers to all types of sheets supported by the image forming apparatus 100.

In the present embodiment, the information of the sheets stored in the sheet feed cassettes 52 through 55, i.e., sheet information, is managed under the data structure illustrated in Table 1 below. That is, a sheet size, size X (sheet width), size Y (sheet length) and sheet type can be set for the respective sheet feed cassettes 52 through 55. The information is stored in a RAM of the memory 102 under the control of the CPU 101, and is read or rewritten arbitrarily.

TABLE 1

| CASSETTE No. | SHEET SIZE | SIZE X | SIZE Y | SHEET TYPE |
| --- | --- | --- | --- | --- |
| CASSETTE 1 | USER SETTING | 210 mm | 256 mm | PLAIN PAPER |
| CASSETTE 2 | A4 | — | — | THICK PAPER |
| CASSETTE 3 | B5 | — | — | THIN PAPER |
| CASSETTE 4 | A4 | — | — | OHP SHEET |

The value of sheet size is selected from sizes stored in the ROM of the memory 102 or the auxiliary storage device 103 in advance, such as A series and B series, or from a user-set size. Size X and size Y are numerical values referred to when the sheet size is the user-set size. The sheet type is selected from those stored in the ROM or the auxiliary storage device 103 in advance, such as plain paper and thick paper.

Size Detection Configuration

Figure 6:
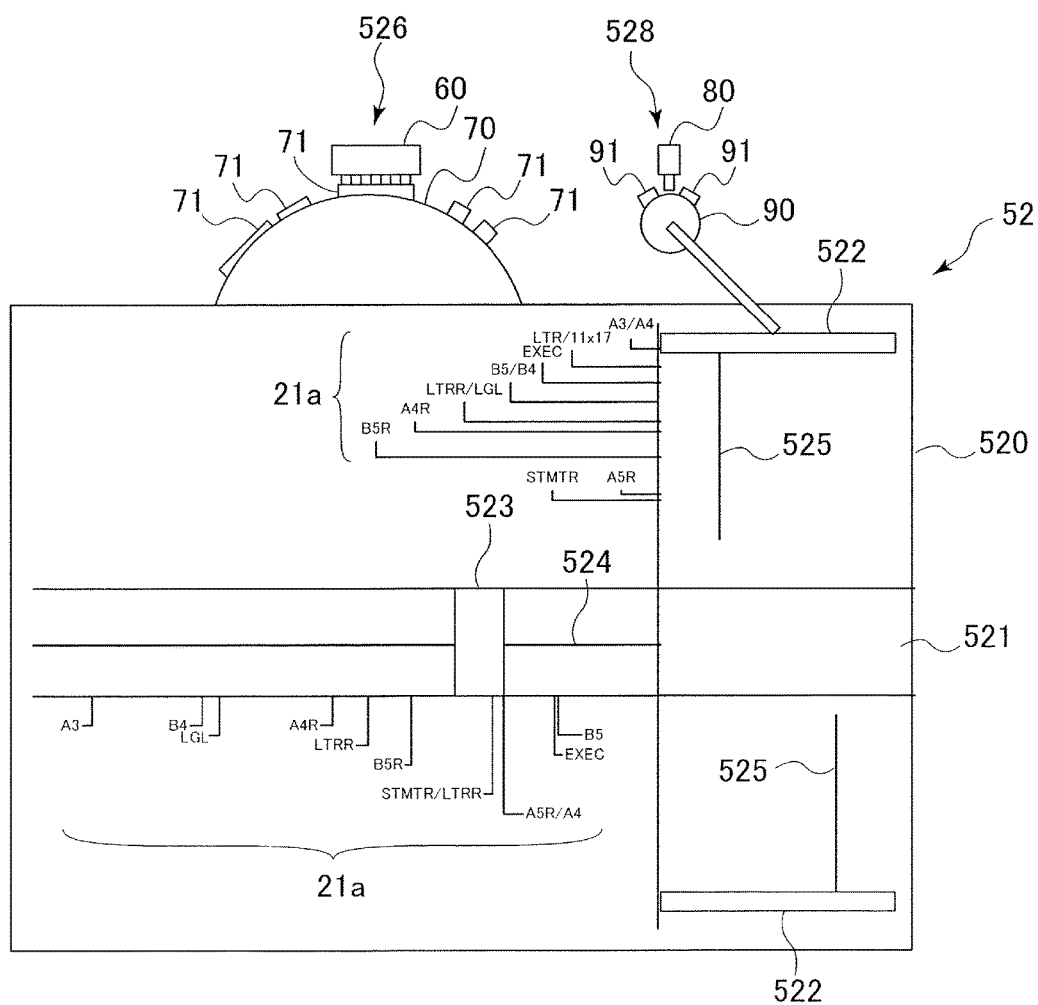
FIG. 6 is a plan view illustrating a configuration of a sheet feed cassette.

Next, a detection configuration by which the CPU 101 detects the sheet sizes stored in the sheet feed cassettes 52 through 55 will be described. FIG. 6 is a view illustrating the sheet feed cassette 52 from above, and the other sheet feed cassettes 53, 54 and 55 adopt similar configurations. As illustrated in FIG. 6, the sheet feed cassette 52 includes a supporting portion 521 supporting the sheets, a casing 520 surrounding the supporting portion 521, and side regulating guides 522 and 522 and a trailing edge regulating guide 523 that regulate sheets supported on the supporting portion 521.

The casing 520 is supported movably in up-down directions in the drawing, i.e., vertical direction, with respect to the frame member of the printing apparatus 105. That is, the sheet feed cassette 52 is mounted so that it can be drawn out, that is, opened and closed, with respect to the apparatus body of the image forming apparatus 100. Further, a known sheet feed unit (not shown) such as a unit adopting a separation roller or an adsorption belt is arranged as a sheet feeding unit configured to feed sheets on the sheet feed cassette 52. The sheet placed on the supporting portion 521 is conveyed by the sheet feed unit to the right direction in the drawing, i.e., horizontal direction, and fed to the image forming unit 51.

The side regulating guides 522 and 522 are a pair of regulation plates that can be moved in a width direction of the sheet along a rail 525 arranged along the direction of movement of the sheet feed cassette 52. The side regulating guides 522 and 522 abut against both side portions of the sheet supported on the supporting portion 521, and regulate end positions of the sheet. The trailing edge regulating guide 523 is a regulation plate movable along a rail 524 arranged along a feeding direction of the sheet, and the guide 523 abuts against an upstream end in the feeding direction, that is, trailing edge, of the sheet supported on the supporting portion 521 to regulate the trailing edge position of the sheet. Marks 21a are provided on the supporting portion 521 at positions corresponding to a plurality of sheet sizes as marks that are used by the user for moving the side regulating guides 522 and 522 and the trailing edge regulating guide 523.

A sheet width detection portion 528 configured to detect a position of the side regulating guide 522 and a sheet length detection portion 526 configured to detect a position of the trailing edge regulating guide 523 are arranged on the sheet feed cassette 52 as side detection portions for detecting the size of the sheet supported on the supporting portion 521. The sheet width detection portion 528 is composed of a width detection disk 90 connected to one of the side regulating guides 522 and a width detection switch 80 capable of detecting a pivot angle of the width detection disk 90. Further, the sheet length detection portion 526 is composed of a length detection disk 70 connected to the trailing edge regulating guide 523, and a length detection switch 60 capable of detecting the pivot angle of the length detection disk 70.

Figure 7A:
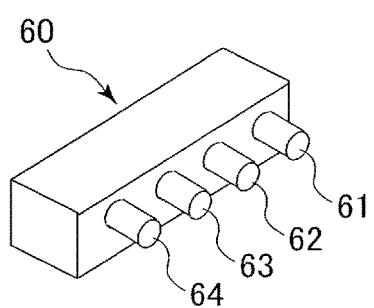
FIG. 7A is a perspective view of a detection switch of a sheet length detection portion.
Figure 7B:
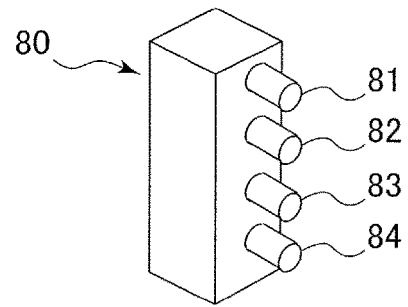
FIG. 7B is a perspective view of a detection switch of a sheet width detection portion.

The sheet width detection portion 528 and the sheet length detection portion 526 detect the positions of the corresponding regulating guides 522 and 523 using mutually similar mechanisms. That is, the respective detection disks 70 and 90 can pivot along with the movement of the corresponding regulating guides 522 and 523. Further, projection portions 71 and 91 arranged to oppose to detection switches 60 and 80 in a state where the regulating guide is arranged at a specific position are formed on outer circumferences of the disks. As illustrated in FIGS. 7A and 7B, the detection switches 60 and 80 are equipped with a plurality of detection portions 61, 62, 63, 64, 81, 82, 83 and 84 capable of detecting the projecting portions 71 and 91, respectively.

The CPU 101 can distinguish the positions of the regulating guides 522 and 523 by ON/OFF patterns of the detection switches 60 and 80. Specifically, as illustrated in the following Table 2, the size of the sheet set in the sheet feed cassette 52 is determined by referring to a table representing the corresponding relationship between the detection pattern of the detection switches 60 and 80 and the sheet size. The data is saved in advance in the ROM of the memory 102 or the auxiliary storage device 103.

TABLE 2

| SHEET SIZE | WIDTH (mm) | LENGTH (mm) | SHEET WIDTH DETECTION SWITCHES | | | | SHEET LENGTH DETECTION SWITCHES | | | |
|---|---|---|---|---|---|---|---|---|---|---|
| | | | 81 | 82 | 83 | 84 | 61 | 62 | 63 | 64 |
| B5 | 257 | 182 | ON | — | — | ON | ON | ON | ON | ON |
| EXEC | 267 | 184 | ON | — | — | ON | ON | ON | ON | ON |
| A5R | 148.5 | 210 | — | ON | — | ON | ON | — | ON | ON |
| A4 | 297 | 210 | ON | — | ON | ON | ON | — | ON | ON |
| STMTR | 139.7 | 215.9 | — | ON | — | ON | ON | — | ON | ON |
| LTR | 279.4 | 215.9 | ON | — | — | ON | ON | — | ON | ON |
| B5R | 182 | 257 | — | ON | — | ON | ON | — | ON | — |
| LTRR | 215.9 | 279.4 | ON | ON | — | ON | — | ON | ON | ON |
| A4R | 210 | 297 | ON | ON | — | ON | — | — | ON | ON |
| LGL | 215.9 | 355.6 | ON | ON | — | ON | ON | ON | — | — |
| B4 | 257 | 364 | ON | — | — | ON | ON | ON | ON | — |
| A3 | 297 | 420 | ON | — | ON | ON | — | ON | — | — |
| LDR | 279.4 | 431.8 | ON | — | — | ON | — | — | ON | — |

The sheet width detection portion 528 and the sheet length detection portion 526 described above are an example of a size detection unit capable of detecting the size of the sheet supported on the sheet support portion, and other types of detection mechanisms can also be adopted. For example, a photoelectric sensor such as a through-beam sensor configured to detect a sheet via a flag that can be abutted against the sheet, or a reflection sensor configured to detect reflected light from the sheet can be used. Further, the size detection unit can adopt a configuration where only either the width or the length of the sheet can be detected.

Method for Setting Sheet Information

Next, a method for setting the size and the type of the sheet set in the sheet feed cassettes 52 through 55 in the image forming apparatus 100 will be described. In the present embodiment, two modes are available as a process for setting the sheet size: a user setting mode in which the sheet size is set manually; and an automatic size detection mode in which the sensors provided to the sheet feed cassettes 52 through 55 are used to perform automatic detection. If the automatic size detection mode is selected, the CPU 101 acquires the sheet size based on a detection signal sent from a size detection configuration described later.

Figure 3A:
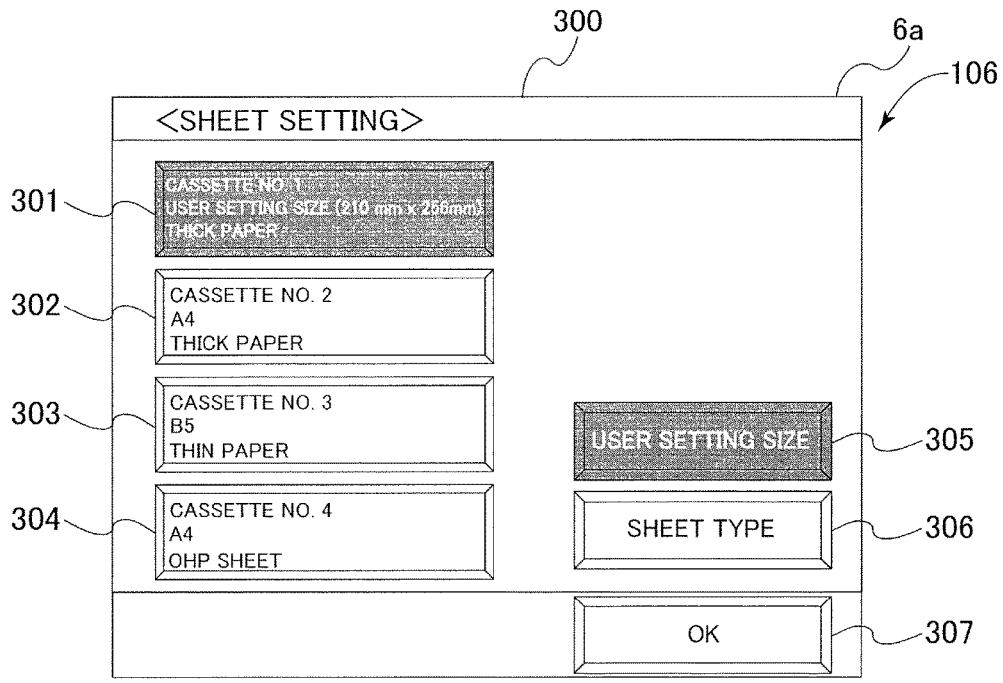
FIG. 3A is an image illustrating a sheet setting screen displayed on an operation panel.

As illustrated in FIG. 3A, the operation panel 106 can display a sheet setting screen 300 in which the size and the type of the sheets stored in the sheet feed cassettes 52 through 55 can be set. The sheet setting screen 300 includes display areas 301, 302, 303 and 304 displaying the size and the type of sheet set at that point of time for each cassette. The display areas 301 through 304 are displayed such that the cassette from which sheets are fed using color or brightness is visualized, and the selected cassette can be changed to other cassettes by touching the display.

Figure 4:
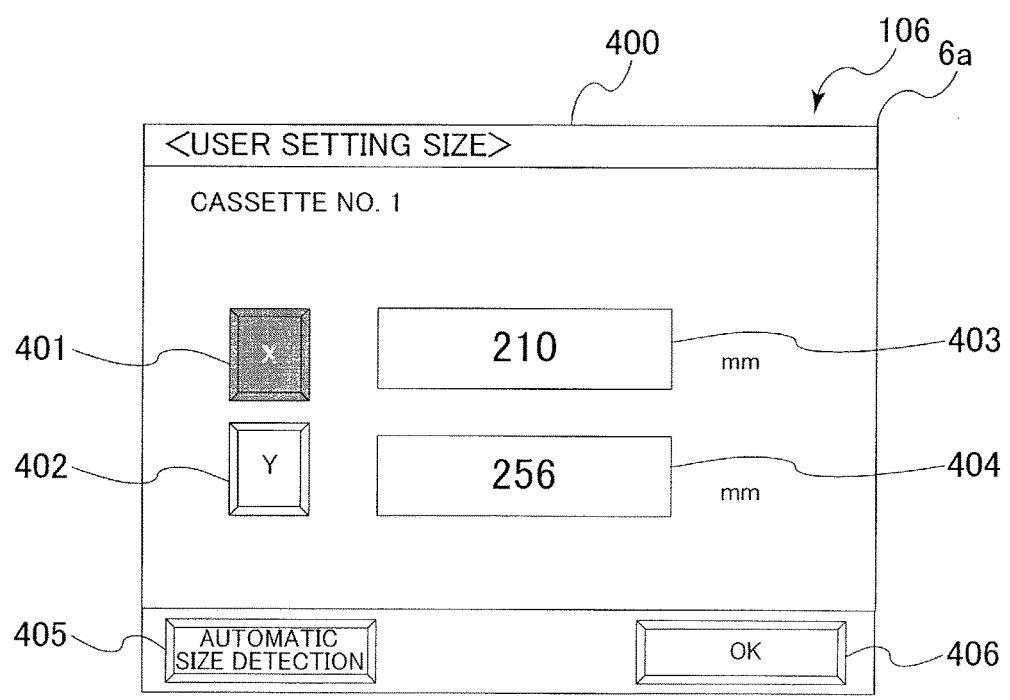
FIG. 4 is an image illustrating a user setting screen displayed on the operation panel.

Meanwhile, if a user-set size button 305 of the sheet setting screen 300 is touched, then the user setting mode is selected, and a user setting screen 400 illustrated in FIG. 4 is displayed on the operation panel 106. In a state where the user setting screen 400 is displayed, input items are selected from size X (sheet width) and size Y (sheet length) by touching an X button 401 and a Y button 402, and numerical values can be entered by operating a ten key. Further, an automatic size detection button 405 for cancelling the user setting mode and switching to the automatic size detection mode is displayed on the user setting screen 400.

If an OK button 406 is touched in a state where numerical values are displayed in entry fields 403 and 404, the numerical values are recognized as sheet size by the CPU 101, and the size is displayed on the sheet setting screen 300. That is, if the OK button 406 is touched in a state illustrated in FIG. 4, a user-set size of "210 mm×256 mm" is displayed in the display area 301, as illustrated in FIG. 3A. At this time, the state in which the user setting mode is selected is displayed visually by the user-set size button 305.

Figure 5A:
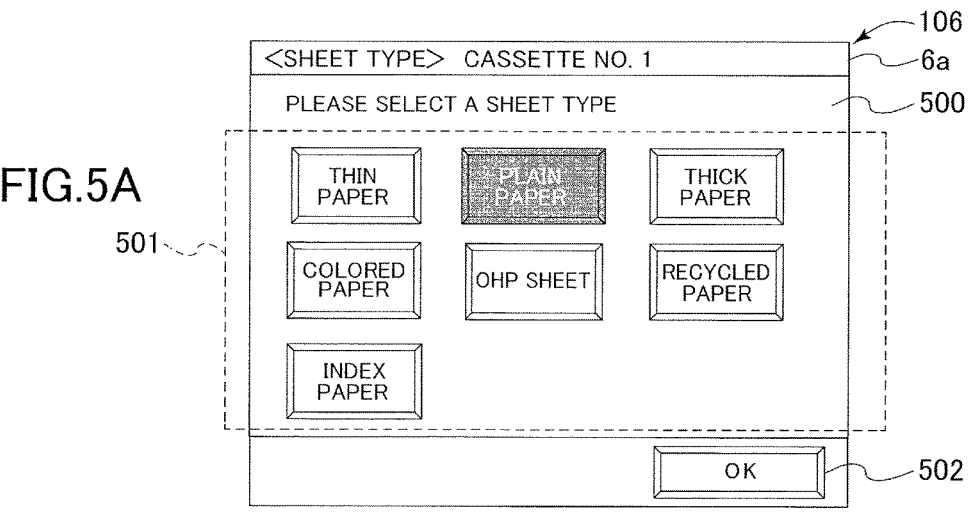
FIG. 5A is an image illustrating a sheet type selection screen displayed on the operation panel.
Figure 5B:
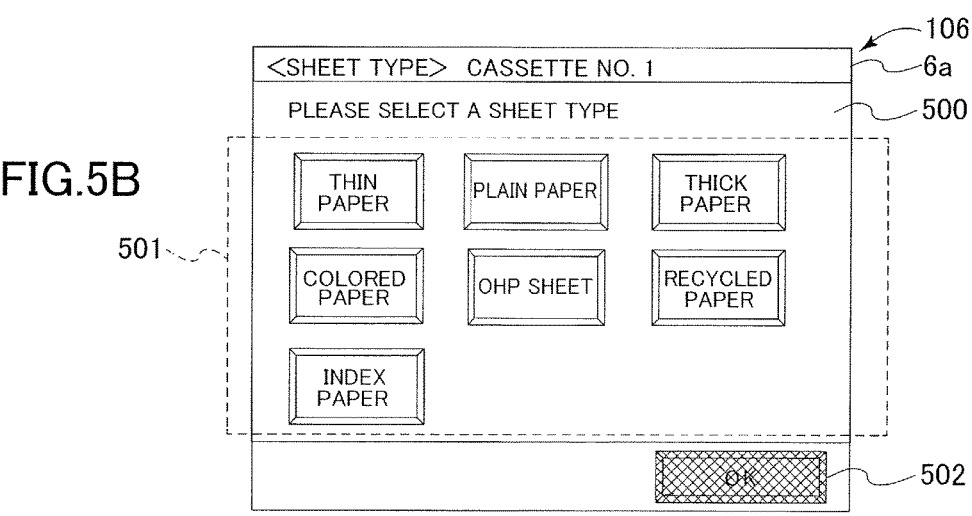
FIG. 5B is an image illustrating a sheet type selection screen in a case where the sheet type is unselected.

In order to set the sheet type, the user touches a sheet type button 306 of the sheet setting screen 300. Then, as illustrated in FIG. 5A, a sheet type selection screen 500 including a group of buttons 501 allowing the user to select the sheet type is displayed on the touch panel 6a of the operation panel 106. As illustrated in FIG. 5B, if none of the group of buttons 501 is selected on the sheet type selection screen 500, an OK button 502 is displayed with a halftone dot meshing, and cannot be operated. If one of the group of buttons 501 is selected, the OK button 502 becomes operable (refer to FIG. 5A), and by operating the OK button 502, the selected sheet type is determined as the sheet type, and the display is returned to the sheet setting screen 300.

Figure 5C:
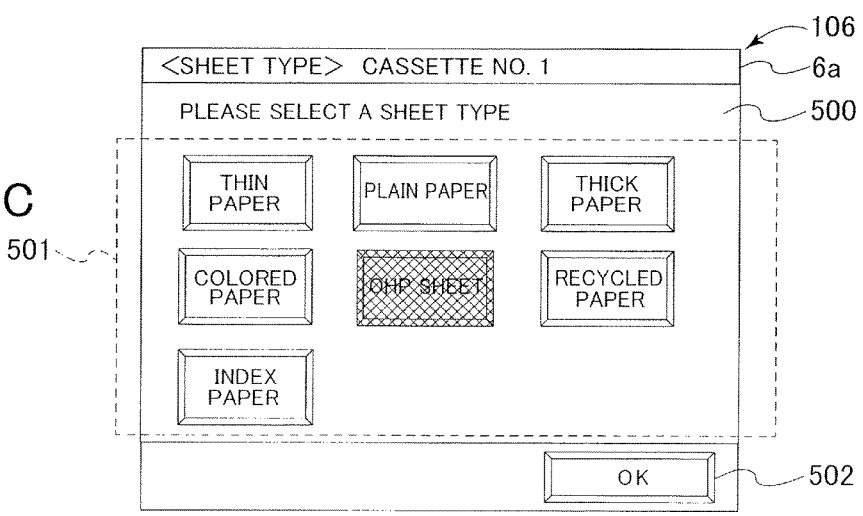
FIG. 5C is an image illustrating the sheet type selection screen in a case where a portion of the sheet types cannot be selected.

As illustrated in FIG. 5C, on the sheet type selection screen 500, the sheet type prohibited from being combined with the sheet size that has been set already is displayed as a non-operable button by halftone dot meshing, based on a predetermined combination condition described later. For example, in a state where a user-set size of "210 mm×256 mm" is registered as illustrated in FIG. 3A, an OHP sheet is in a non-selectable state.

Flow of Setting Sheet Information

Next, the contents of a process for setting the sheet information by operating the operation panel 106 described above will be described with reference to the flowchart of FIG. 8. The process for setting the sheet information refers to a procedure in which a first information regarding the sheet size and a second information regarding the sheet type are recognized by the CPU 101, and the information is stored in the memory 102 as data that the CPU 101 can refer to during a printing job and the like. Hereafter, the control flow regarding the sheet feed cassette 52 will be described, and similar flows are executed in parallel to the respective sheet feed cassettes 53, 54 and 55 by the CPU 101.

In a state where the automatic size detection mode is selected (S101: N), the CPU 101 executes the sheet size detection process if a condition to execute automatic size detection is satisfied (S102: Y) (S103). The sheet size detection process is executed, for example, in a state where a sensor (not shown) of the printing apparatus 105 detects that the sheet feed cassette 52 has been opened and then closed.

In a state where the user setting mode is selected (S101: Y), the CPU 101 displays the user setting screen 400 (FIG. 4) on the operation panel 106, and stands by for the user to enter the sheet size (S106). If the automatic size detection button 405 is touched during standby and the user setting mode is cancelled (S105: Y), the mode is changed to the automatic size detection mode, and the sheet size detection process (S103) is executed. The CPU 101 stores information, which is acquired by the sheet size detection process in the automatic size detection mode or which is entered during the user setting mode, into the memory 102 (S107).

If the user operates the sheet type button 306 (FIG. 3A) on the sheet setting screen 300 (S108: Y), the CPU 101 displays the sheet type selection screen 500 (FIG. 5A) on the operation panel 106 (FIG. 5A) and waits for the user to perform a selection operation (S109). At this time, the contents of display of the sheet type selection screen 500 is controlled (FIG. 5C) such that only the sheet types that can be combined with the already registered sheet size are selectable. In a state where the sheet type is selected by the user, the selected information is stored in the memory 102 as the second information related to the sheet type (S110).

Figure 8:
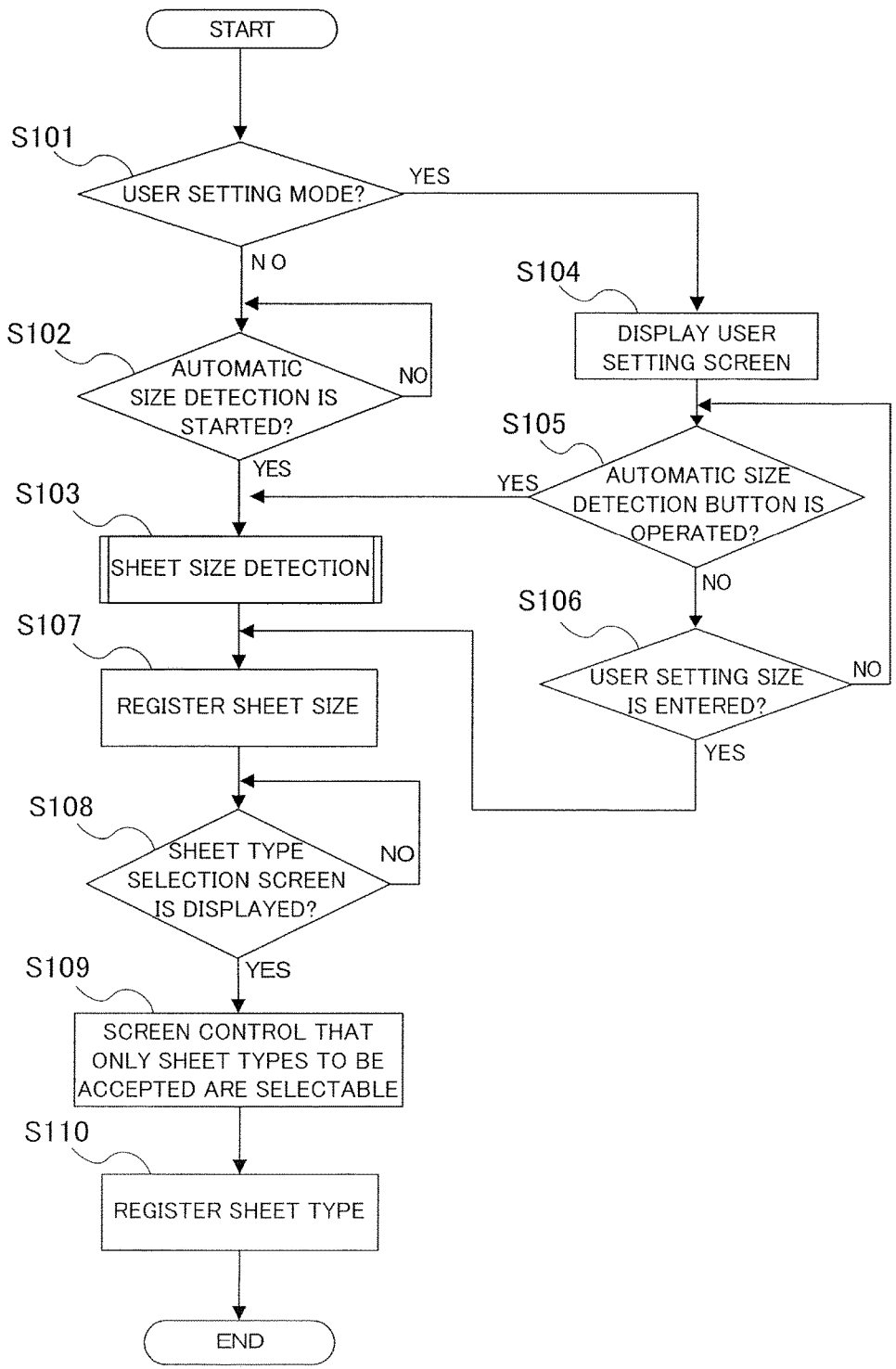
FIG. 8 is a flowchart illustrating a procedure for setting a sheet information.

A standard flow of setting is illustrated in FIG. 8, but the process can be performed in a different order, as long as information related to the sheet size and the sheet type can be set appropriately. For example, if opening and closing of the sheet feed cassette 52 is detected while displaying the sheet type selection screen 500 (S109) in the automatic size detection mode, it may be possible to execute the sheet size detection process and confirm whether there had been a change in size. Further, the temporal order of setting the size (S101 through S107) and setting the type (S108 through S110) can be reversed, and if the size or the type is already set, only the other information may be set.

Combination Condition of Size and Type

Now, we will describe the combination of sheet size and sheet type supported by the image forming apparatus 100. In the present embodiment, as illustrated in the following Table 3, among the sheets handled in the image forming apparatus 100, it is set so that the printing job is not executed in a specific combination of size and type. In other words, a combination condition specifying the allowable combination of sheet size and sheet type, in other words, a prohibition condition prohibiting a specific combination, is set for each of the sheet feed cassettes 52 through 55. However, in the table, check mark represents an allowable (usable) combination, and "x" mark represents a prohibited combination.

TABLE 3

| SHEET TYPE | SHEET SIZE | 1 | 2 | 3 | 4 |
|---|---|---|---|---|---|
| PLAIN PAPER | A3 | X | ✓ | ✓ | ✓ |
|  | A4 | ✓ | ✓ | ✓ | ✓ |
|  | A4R | X | ✓ | ✓ | ✓ |
|  | B5 | ✓ | ✓ | ✓ | ✓ |
|  | B5R | X | ✓ | ✓ | ✓ |
|  | USER-DEFINED SIZE | ✓ | ✓ | ✓ | ✓ |
| OHP SHEET | A3 | X | X | X | X |
|  | A4 | ✓ | ✓ | ✓ | ✓ |
|  | A4R | X | X | X | X |
|  | B5 | X | X | X | X |
|  | B5R | X | X | X | X |
|  | USER-DEFINED SIZE | X | X | X | X |
| THICK PAPER | A3 | X | ✓ | ✓ | ✓ |
|  | A4 | ✓ | ✓ | ✓ | ✓ |
|  | A4R | X | ✓ | ✓ | ✓ |
|  | B5 | ✓ | ✓ | ✓ | ✓ |
|  | B5R | X | ✓ | ✓ | ✓ |
|  | USER-DEFINED SIZE | ✓ | ✓ | ✓ | ✓ |
| THIN PAPER | A3 | X | ✓ | ✓ | ✓ |
|  | A4 | ✓ | ✓ | ✓ | ✓ |
|  | A4R | X | ✓ | ✓ | ✓ |
|  | B5 | ✓ | ✓ | ✓ | ✓ |
|  | B5R | X | ✓ | ✓ | ✓ |
|  | USER-DEFINED SIZE | ✓ | ✓ | ✓ | ✓ |

A validity/invalidity of the respective combinations is set arbitrarily according to the configuration of the image forming apparatus 100. For example, in the case of cassette No. 1 of Table 3, an invalid combination is considered to be set if the physical size of the cassette is regulated, and there is no need to consider a combination of a size greater than a certain size and the arbitrary sheet types. Moreover, in a state where the setting (such as a bias voltage applied to the transfer roller 5) of the image forming operation in the image forming unit 51 in the image forming unit 51 is changed according to the material of the sheet, it is considerable to prohibit the combination of size and type exceeding the allowable range of setting.

As described, in a state where the CPU 101 performs a process to set the information of the sheets set in the sheet feed cassettes 52 through 55, the selectable options of the operation that the user can perform are controlled to satisfy the combination condition as illustrated in Table 3. That is, in the present embodiment, only those satisfying the combination condition are displayed as the selectable types in the sheet type selection screen 500 (S109 of FIG. 8). Thereby, if the sheet information is set according to the above-described setting flow, the combination of size and type is set to an appropriate combination automatically.

However, there is a case where the detection of sheet size set in the sheet feed cassettes 52 through 55 is executed in a state where the information related to appropriate combinations of size and type is already stored in the memory 102. For example, if the user switches the mode to the automatic size detection mode by operating the automatic size detection button 405 (FIG. 4) after the sheet size has been set by the user setting mode, the sheet size detection process is executed (S103 of FIG. 8).

Figure 9:
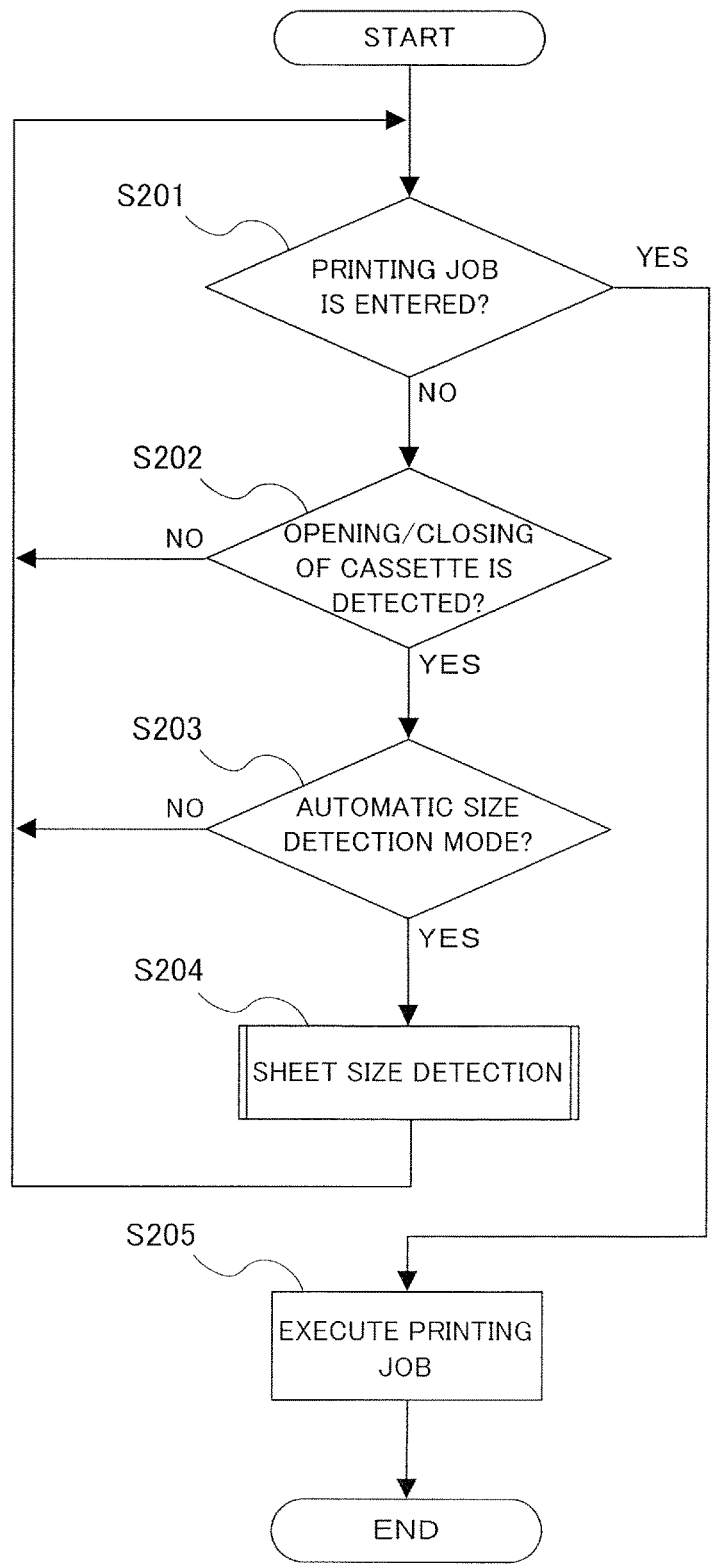
FIG. 9 is a flowchart illustrating a case in which a sheet size detection process is executed.

Further, if the sheet feed cassette 52 is opened and closed (S202: Y) in a state where entry of a printing job is awaited with the sheet information already set, as illustrated in FIG. 9, it may be possible that the set sheet is replaced with a different sized sheet. Therefore, the CPU 101 confirms that the automatic size detection mode is selected (S203: Y), and executes a sheet size detection process (S204). If a printing job is entered during standby (S201: Y), the CPU 101 starts to execute the printing job (S205).

In these cases, if the sheet size is detected in a state where the appropriate combination of sheet information is stored in the memory 102, it may be considerable to update the information stored in the memory 102 automatically by the sheet size of the detection result. However, if the detected size does not correspond to the sheet size stored in the memory 102, there may be a case where the detected size and the sheet type stored in the memory 102 do not satisfy the combination condition.

For example, we will consider a case where the sheet size of A4 and the sheet type of OHP is stored in the memory 102. In this state, we will assume that the user has opened the sheet feed cassette 52 and moved the side regulating guide 522 and the trailing edge regulating guide 523 to set an A3-sized sheet in the sheet feed cassette 52. In that case, the size detected by automatic size detection is A3, and the sheet type stored in the memory 102 is OHP, such that the condition of combination is not satisfied.

Sheet Size Detection Process

Figure 10:
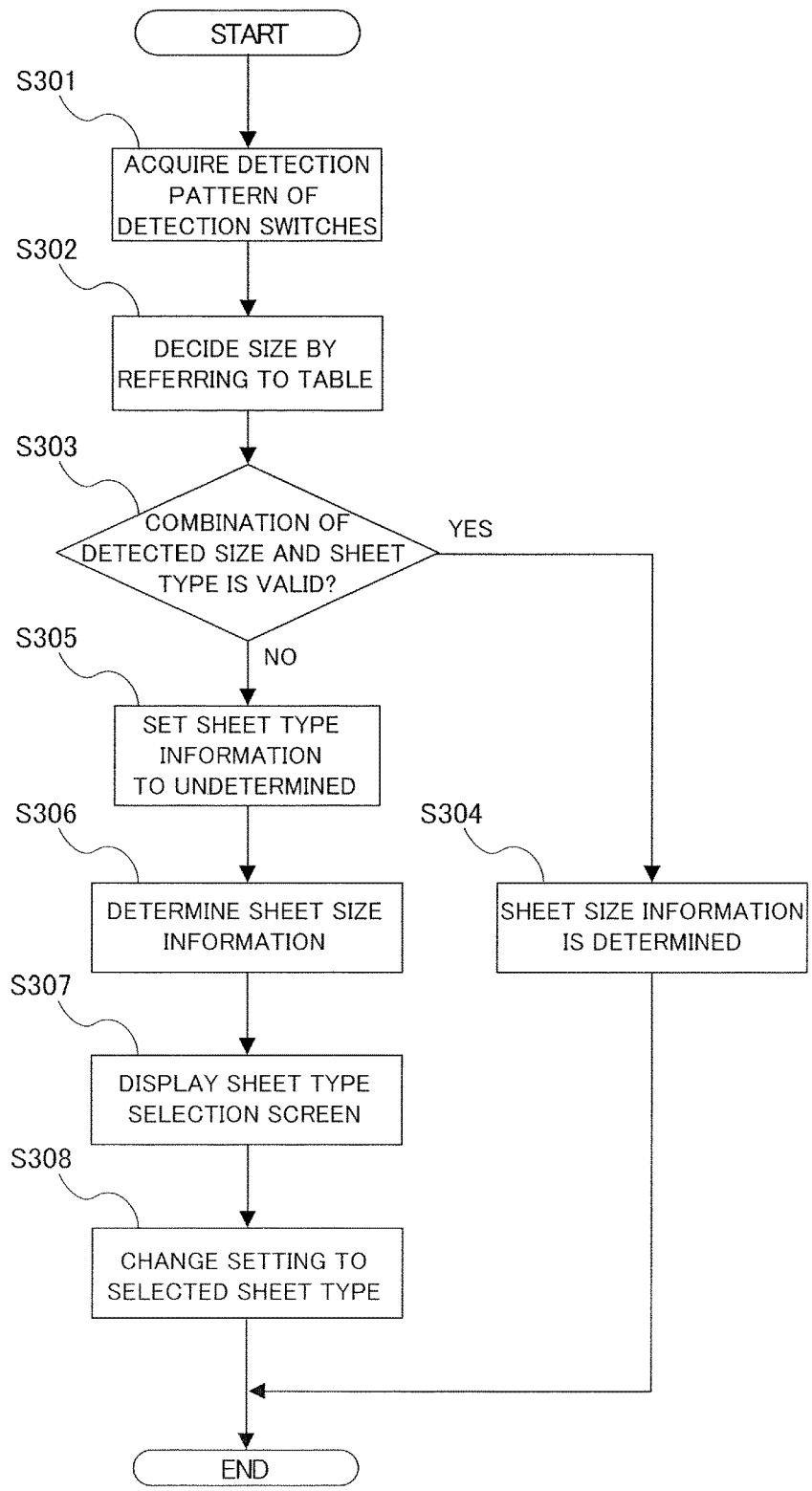
FIG. 10 is a flowchart illustrating a procedure of the sheet size detection process according to a first embodiment.

Based on insights as described above, in the present embodiment, if the sheet size detection process (S103 of FIG. 8, S204 of FIG. 9) is executed in a state where the sheet size, i.e., first information, and the sheet type, i.e., second information, are stored in the memory 102, whether the combination condition is appropriate is determined based on the detection result. Hereafter, the process contents of a case where the CPU 101 executes sheet size detection process with respect to the sheet feed cassette 52 will be described with reference to the flowchart of FIG. 10.

If the sheet size detection process is executed, the CPU 101 acquires a detection pattern of ON/OFF of the detection switches 60 and 80 from the sheet width detection portion 528 and the sheet length detection portion 526 (S301). Then, the sheet size corresponding to the detection signal is derived, for example, by referring to the table illustrated in Table 2 (S302).

Now, the sheet size acquired as a detection result, i.e., detected size, is not stored directly into the memory 102, but whether it satisfies the combination condition with respect to the information having been set as the sheet type is determined (S303). If the detected size is a size that can be combined with the sheet type (S303: Y), the detected size is determined as the sheet size (S304). In this case, if the sheet size stored in the memory 102 differs from the detected size, the sheet size is replaced with the detected size.

Meanwhile, if the detected size does not satisfy the combination condition with respect to the set sheet type (S303: N), the CPU 101 sets the sheet type information to "undetermined" (S305), and determines the detected size as the sheet size (S306). Further, the sheet type selection screen 500 (refer to FIG. 5C), which serves as a reset screen prompting the user to reset (reconfigure) the type of sheet, is displayed on the operation panel 106, and the screen is transited to a state where the selection operation of sheet type by the user can be accepted (S307).

In this case, a portion of the group of buttons 501 representing the sheet type is set to a state where operation is not possible, such as by displaying a halftone dot meshing or by not displaying the button, such that only the buttons that satisfy the combination condition with respect to the determined sheet size is selectable on the sheet type selection screen 500. If the OK button 502 is operated in a state where the sheet type is selected, the sheet type stored in the memory 102 is rewritten to the selected sheet type, and the setting of sheet type is changed (S308). Thereby, the execution of the sheet size detection process is ended.

As described, if the size detection process is executed in a state where the sheet size, i.e., first information, and the sheet type, i.e., second information, satisfying the combination condition are set, a determination process (S303) determining whether the detected size satisfies the combination condition with respect to the sheet type is executed. Therefore, the necessity to perform reset process (S305 through S308) of the sheet information can be judged appropriately according to the determination result.

In the present embodiment, if the detected size does not satisfy the combination condition with respect to the set sheet type, an input process (S307) is executed in which the input of sheet information is accepted, and based on the result of the input process, a rewrite process (S308) is executed in which the sheet information is stored into the memory 102. In this case, a screen on which the user enters information within the range satisfying the combination condition with respect to the detected size is displayed on the operation panel 106, prioritizing the detection result of the sheet size detection process. Therefore, the user can easily reset the sheet information so that the combination condition is satisfied.

In place of the control flow described above, an alternative configuration is considerable in which the detected size is registered in the memory 102 even if the detected size does not satisfy the combination condition with respect to the set sheet type. In that case, in order to prevent a sheet having a prohibited combination of size and type from being fed, it will be preferable to determine the combination condition at the time of input of the printing job at the latest.

However, according to the above-described alternative configuration, during the period from when the sheet size detection process has been executed to when the determination of combination condition is performed, a sheet information whose combination does not satisfy the combination condition will be in a registered state. In that case, at a timing in which the sheet is set in the sheet feed cassette 52, the user cannot recognize that the sheet information is inappropriate, and for example, the user is notified through the operation screen displayed on the operation panel 106 or the display of the external PC that a specific sheet feed cassette cannot be selected. Therefore, the user cannot recognize that the reason why a sheet feed cassette cannot be selected is that the sheet information is inappropriate, which situation may cause frustration. Further, even if a display prompting the user to reset the sheet information is displayed, the user wishing to execute the printing operation is forced to perform a recovery operation, such as confirmation of sheet information.

In contrast, according to the present embodiment, the determining step of determining the combination condition (S303) is executed along with the detecting step of detecting the sheet size (S301, S302), such that the user is notified speedily if the combination of sheet information is inappropriate. Then, new information that is set to satisfy the combination condition is stored into the memory 102 by the resetting step (S305 through S308). Therefore, even if the user has replaced the sheet in the sheet feed cassette 52 with a different sized sheet, the user is capable of coping with the situation if the combination condition is inappropriate, and the usability is improved.

In the determination process (S303), it is also possible to adopt a configuration in which a process of comparing the detected size with the set sheet size is performed in advance, and the combination condition is determined only if the detected size does not correspond to the sheet size, while the size detection process is ended if the detected size corresponds to the sheet size. Further, in the reset process (S305 through S308), it is possible to perform a process to prompt the user to confirm the sheet size and perform resetting if necessary without prioritizing the detection result of the sheet size detection process, or a process to prompt the user to confirm both the sheet size and the sheet type before performing the reset process.

Second Embodiment

Next, a control method for an image forming apparatus according to a second embodiment will be described. The image forming apparatus according to the present embodiment differs from the first embodiment in the contents of process of a case where it is determined that the combination condition is not satisfied. The elements that are similar to the first embodiment are denoted with the same reference numbers, and the descriptions thereof are omitted.

Figure 11:
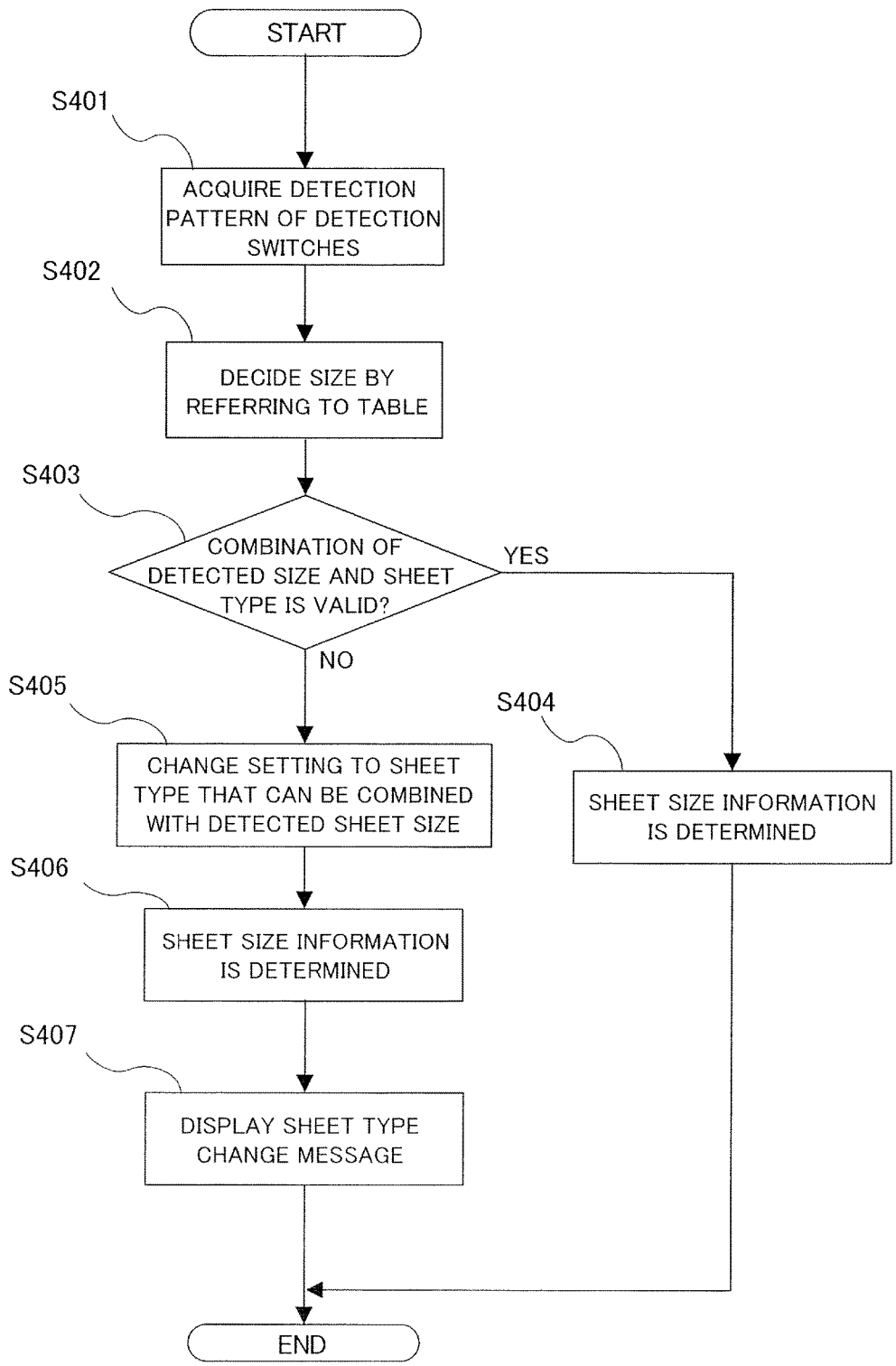
FIG. 11 is a flowchart illustrating a procedure of a sheet size detection process according to a second embodiment.

In the present embodiment, similar to the first embodiment, a sheet size detection process is executed if the CPU 101 detects opening and closing of the sheet feed cassette 52, or if the automatic size detection button 405 is operated in the user setting screen 400. As illustrated in FIG. 11, in executing the sheet size detection process, the CPU 101 detects the sheet size having been set in the sheet feed cassette 52 based on the detection signal acquired (S401) from the sheet width detection portion 528 and the sheet length detection portion 526 (S402).

The CPU 101 determines whether the sheet size acquired as a detection result, i.e., detected size, satisfies the combination condition with respect to the set sheet type (S403), and if the combination is appropriate (S403: Y), determines the detected size as the sheet size (S404). In this case, if the sheet size stored in the memory 102 differs from the detected size, the sheet size is replaced with the detected size.

On the other hand, if the detected size does not satisfy the combination condition with respect to the set sheet type (S403: N), the CPU 101 selects the sheet type information automatically within a combinable range with respect to the detected size, that is, according to a rule specified in advance (S405), and performs a rewrite process (S406) in which the information is stored in the memory 102. In other words, according to the present embodiment, the CPU 101 executes an automatic change process (S405, 406) in which the information stored in the memory 102 is changed to satisfy the combination condition, and the information is stored in the memory 102. As for the automatically selected sheet type, a sheet type generally having a high frequency of use, such as "plain paper", is selected. If the automatic change process is executed, the CPU 101 displays a message indicating that the sheet type has been changed as a notification image notifying a user that the change of setting has been executed on an operation screen of the operation panel 106 or on an external display (S407).

As described, also according to the present embodiment, the determining step of determining the combination condition (S403) is executed along with the detecting step of detecting the sheet size (S401, S402). Then, information set to satisfy the combination condition is stored in the memory 102 in the resetting step (S405 through S407). Therefore, similar to the first embodiment, if the combination condition is inappropriate, reset process is executed instantly, such that the usability is improved.

According to the present embodiment, the CPU 101 resets the sheet information automatically without depending on the input from the user, such that the operation burden of the user can be reduced compared to the first embodiment. It is noted that it is also possible to display a message to confirm the validity/invalidity of the automatic change process to the user in executing the automatic change process, before rewriting the sheet type stored in the memory 102.

The present embodiment has been described assuming that the result of the sheet size detection process is prioritized while the sheet type is subject to change, but the reset process can be performed by a process of correcting the detected size to correspond to the sheet type, or by a process of changing either one of or both the detected size and the sheet type when necessary.

Third Embodiment

Next, a control method for an image forming apparatus according to a third embodiment will be described. The image forming apparatus according to the present embodiment differs from the first embodiment in the contents of process performed in the sheet size detection process. The elements that are similar to the first embodiment are denoted with the same reference numbers, and descriptions thereof are omitted.

Figure 12:
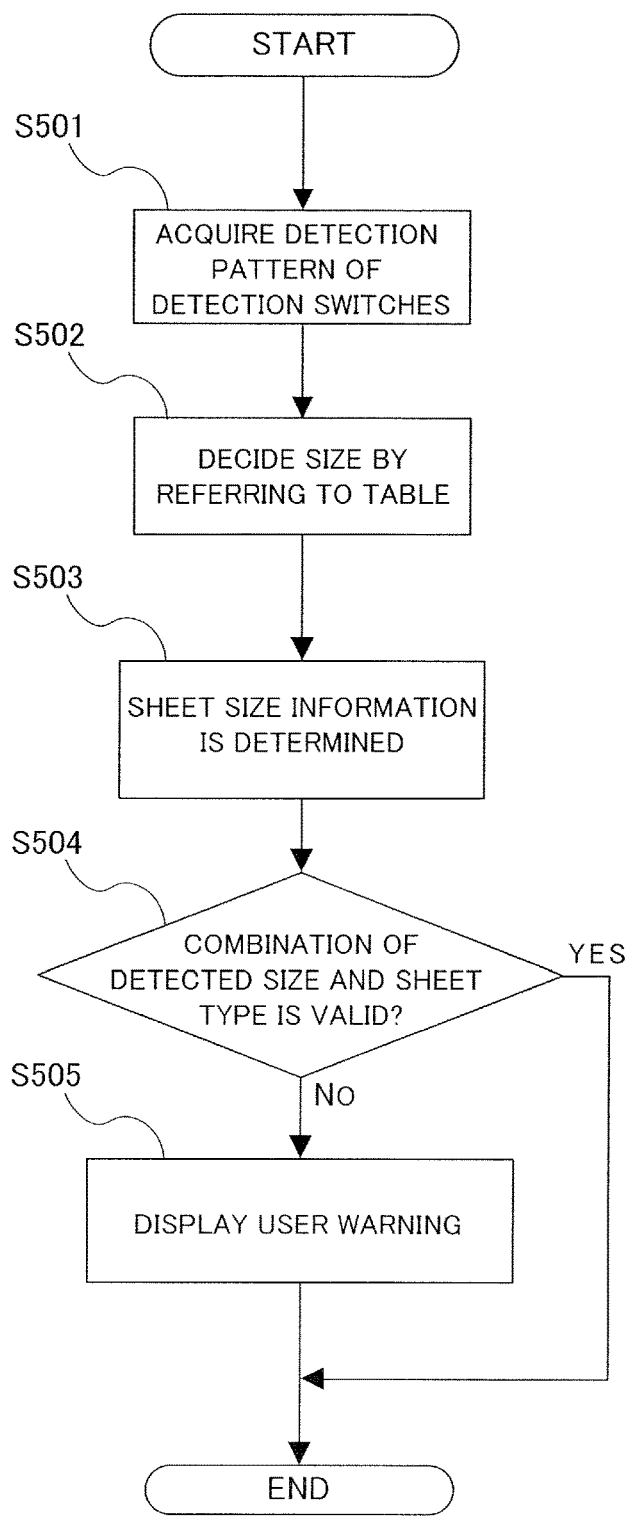
FIG. 12 is a flowchart illustrating a procedure of a sheet size detection process according to a third embodiment.

In the present embodiment, similar to the first embodiment, the sheet size detection process is executed if the CPU 101 has detected the opening and closing of the sheet feed cassette 52, or if the automatic size detection button 405 has been operated on the user setting screen 400. As illustrated in FIG. 12, in executing the sheet size detection process, the CPU 101 detects the sheet size having been set in the sheet feed cassette 52 based on the detection signal acquired (S501) from the sheet width detection portion 528 and the sheet length detection portion 526 (S502).

The CPU 101 stores the sheet size acquired as a detection result, i.e., detected size, in the memory 102 (S503), and determines whether the combination condition is satisfied with respect to the set sheet type (S504). In this case, if the detected size differs from the sheet size stored in the memory 102, the sheet size is replaced with the detected size. Further, the determining step of determining the combination condition (S504) is executed along with the execution of the detecting step of detecting the sheet size (S501, S502) without setting a standby time.

If the detected size satisfies the combination condition with respect to the set sheet type (S504: Y), the CPU 101 terminates the process. On the other hand, if the combination condition is not satisfied (S504: N), the CPU 101 notifies that the sheet information not supported by the image forming apparatus 100 is set (S505). In other words, the CPU 101 executes a notification process in which the user is notified the need to reset either one of or both the size and the type of the sheet.

Figure 3B:
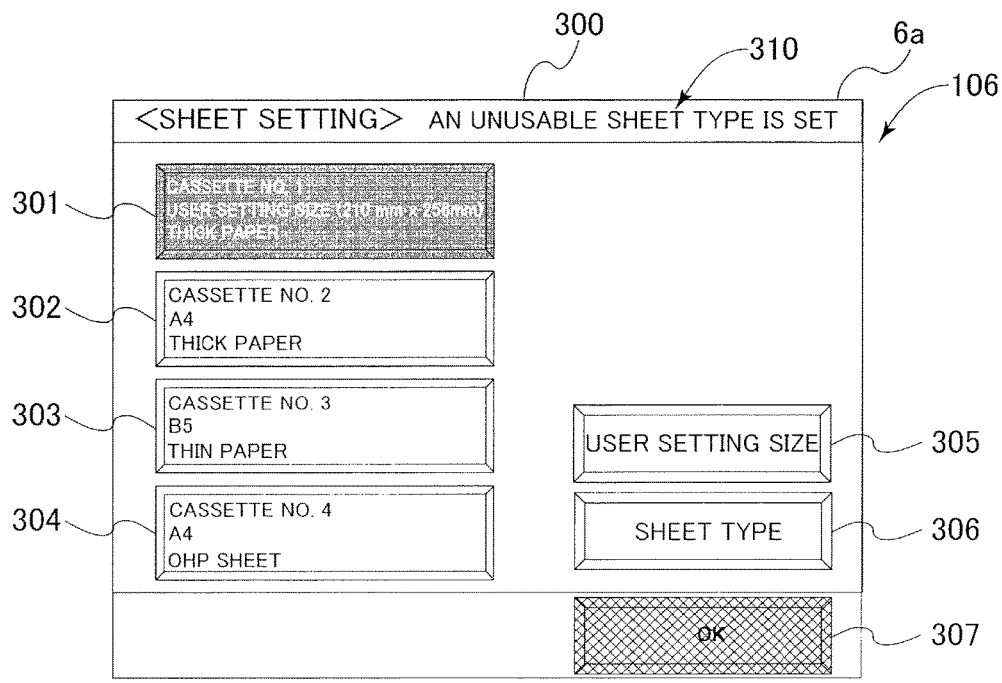
FIG. 3B is an image illustrating a sheet setting screen in a state where a warning message is displayed.

The notification method can be, for example, displaying a warning message 310 on the sheet setting screen 300, as illustrated in FIG. 3B. As another method, the notification can be performed by displaying a pop-up message on the operation screen displayed on an external display, for example. Further, the notification can be performed by sound or a warning lamp.

According to the present embodiment, if the warning message 310 is displayed on the operation panel 106, an OK button 307 is in a non-operable state, to prompt the user to confirm the sheet size and the sheet type. The display of the warning message 310 is cancelled if the combination of the sheet size and the sheet type becomes appropriate by the operation of the user.

As described, also according to the present embodiment, the determining step of determining the combination condition (S504) is executed accompanying the detecting step of detecting the sheet size (S501, S502). Then, a notification step is executed in which the user is encouraged to review the sheet information through the operation panel 106 (S505). Therefore, if the combination condition is inappropriate, the user can cope with the situation on the spot, and the usability can be improved.

Other Embodiments

In the above embodiments, the procedure of control of the CPU 101 with respect to the sheets set in the sheet feed cassettes 52 through 55 have been described, but similar procedures can be performed to sheets set in other sheet support portions. For example, the present technique can be applied to a sheet storage portion fixed to the printing apparatus 105, or to sheets set in the manual feed apparatus 56.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127913, filed on Jun. 28, 2016, which is hereby incorporated by reference wherein in its entirety.

What is claimed is:

1. An image forming apparatus comprising:
   a cassette in which a sheet is stored and which can be opened and closed;
   a size detector configured to detect a size of a sheet stored in the cassette;
   a user interface through which type information representing a type of a sheet stored in the cassette is inputted;
   a memory capable of storing a size setting and a type setting of a sheet stored in the cassette, wherein the size setting is size information acquired as a detection result of the size detector, and wherein the type setting is type information inputted through the user interface;
   an image forming unit configured to form an image on a sheet fed from the cassette depending on the size setting and the type setting stored in the memory;
   a controller comprising a processor accessible to the memory, the controller being configured to execute processes including:
   a determination process to determine whether size information acquired as a detection result of the size detector in response to a closing operation of the cassette and the type setting stored in the memory satisfy a predetermined combination condition; and
   a changing process to change, if the combination condition is not satisfied in the determination process, the size setting in the memory to the size information acquired as the detection result of the size detector in response to the closing operation of the cassette and the type setting in the memory to predetermined type information that satisfies the combination condition with respect to the size information acquired as the detection result of the size detector in response to the closing operation of the cassette.

2. The image forming apparatus according to claim 1, wherein the controller is configured to determine the type information used for changing the type setting in the changing process by means of selecting type information out of a set of predetermined type information stored in the memory.

3. The image forming apparatus according to claim 1, wherein the controller is configured to execute the changing process automatically if the combination condition is not satisfied in the determination process.

4. The image forming apparatus according to claim 1, wherein the controller is configured to control the user interface, if the changing process is executed, to display an image indicating that the type setting related to the cassette has been changed.

5. The image forming apparatus according to claim 1, wherein the controller is configured to notify a user, if the changing process is executed, that the type setting related to the cassette has been changed.

6. The image forming apparatus according to claim 1, wherein the combination condition is stored in the memory as data representing validity/invalidity of a combination of a sheet size and a sheet type for each combination of a sheet size among sheet sizes supported by the image forming apparatus and a sheet type among sheet types supported by the image forming apparatus.

7. The image forming apparatus according to claim 1, wherein the type setting refers to material of a sheet, thickness of a sheet, and/or whether any surface treatment is performed on a sheet.

8. The image forming apparatus according to claim 1, wherein the size detector comprises a sheet width detector configured to detect a position of a side edge regulating guide in a width direction orthogonal to a feeding direction of a sheet, the side edge regulating guide being provided on the cassette and configured to regulate a side edge of a sheet in the width direction.

9. The image forming apparatus according to claim 1, wherein the size detector comprises a sheet length detector configured to detect a position of a trailing edge regulating guide in a feeding direction of a sheet, the trailing edge regulating guide being provided on the cassette and configured to regulate a trailing edge of a sheet in the feeding direction.

10. The image forming apparatus according to claim 1, wherein the controller is configured to change the type setting in the memory in the changing process to a default value for type information stored in the memory.

11. The image forming apparatus according to claim 1, wherein the controller is configured to execute the determination process and the changing process without starting an image forming job if the cassette in an open state is closed in a state where the image forming job is not entered.

12. The image forming apparatus according to claim 1, wherein the user interface can input size information representing a size of a sheet stored in the cassette, and in a case where size information is inputted through the user interface, the inputted size information is stored in the memory as the size setting.

13. An image forming apparatus comprising:
- a cassette in which a sheet is stored and which can be opened and closed;
- a size detector configured to detect a size of a sheet stored in the cassette;
- a user interface through which type information representing a type of a sheet stored in the cassette is inputted;
- a memory capable of storing a size setting and a type setting of a sheet stored in the cassette, wherein the size setting is size information acquired as a detection result of the size detector, and wherein the type setting is type information inputted through the user interface;
- an image forming unit configured to form an image on a sheet fed from the cassette depending on the size setting and the type setting stored in the memory; and
- a controller comprising a processor accessible to the memory, the controller being configured to execute processes including:
- a changing process to change the size setting in the memory with size information acquired as a detection result of the size detector in response to a closing operation of the cassette;
- a determination process to determine whether the size information acquired as the detection result of the size detector in response to the closing operation of the cassette and the type setting stored in the memory satisfy a predetermined combination condition; and
- an input process to control the user interface to display a set screen on which a type of a sheet stored in the cassette is inputted, the input process being executed if the combination condition is not satisfied in the determination process.

14. The image forming apparatus according to claim 12, wherein the controller is configured to control the user interface, if the combination condition is not satisfied in the determination process, to display a message that indicates that a combination of a sheet size and a sheet type is prohibited.

15. The image forming apparatus according to claim 13, wherein the controller is configured to control the user interface in the input process such that the set screen allows a sheet type to be selected only out of sheet types that satisfy the combination condition with respect to the size information acquired as the detection result of the size detector in response to the closing operation of the cassette.

16. A control method for an image forming apparatus comprising:
- (a) storing a size setting representing a size of a sheet stored in a cassette of the image forming apparatus into a memory;
- storing a type setting representing a type of a sheet stored in the cassette of the image forming apparatus into the memory; and
- (c) determining whether size information acquired as a detection result of a size detector in response to a closing operation of the cassette and the type setting stored in the memory satisfy a predetermined combination condition; and
- (d) changing, if the combination condition is not satisfied in the determining step, the size setting in the memory to the size information acquired as the detection result of the size detector in response to the closing operation of the cassette and the type setting in the memory to predetermined type information that satisfies the combination condition with respect to the size information acquired as the detection result of the size detector in response to the closing operation of the cassette.

17. A non-transitory computer-readable storage medium storing a program based on which a computer executes the respective steps of the control method for the image forming apparatus according to claim 16.

* * * * *